United States Patent
Oh (10) Patent No.: US 8,380,088 B2
(45) Date of Patent: Feb. 19, 2013

(54) IMAGE FORMING APPARATUS

(75) Inventor: Joo Young Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 216 days.

(21) Appl. No.: 12/923,196

(22) Filed: Sep. 8, 2010

(65) Prior Publication Data

US 2011/0076046 A1   Mar. 31, 2011

(30) Foreign Application Priority Data

Sep. 29, 2009   (KR) .................. 10-2009-0092385

(51) Int. Cl.
*G03G 15/00* (2006.01)

(52) U.S. Cl. ................ 399/9; 399/90; 399/114

(58) Field of Classification Search ............. 399/9, 90, 399/114, 88, 37, 12, 13
See application file for complete search history.

(56) References Cited

U.S. PATENT DOCUMENTS

| 2005/0110898 A1* | 5/2005 | Ryu ............................. 348/372 |
| 2007/0077085 A1* | 4/2007 | Kitamura et al. ............. 399/110 |

FOREIGN PATENT DOCUMENTS

JP   2004-109166   4/2004

* cited by examiner

*Primary Examiner* — Walter L Lindsay, Jr.
*Assistant Examiner* — Roy Y Yi
(74) *Attorney, Agent, or Firm* — Staas & Halsey LLP (57) ABSTRACT

An image forming apparatus detects whether a cover is opened or closed in each of a general power mode and a power saving mode. The image forming apparatus includes a cover opening/closing sensor to detect opening or closing of a cover, a cover opening/closing sensing power-supply input unit to provide or not to provide a voltage different from an operation voltage of the image forming apparatus, to the cover opening/closing sensor according to the opening or closing of the cover, and an interlock switch to connect or not to connect the cover opening/closing sensor to the cover opening/closing sensing power-supply unit according to the opening or closing of the cover.

43 Claims, 6 Drawing Sheets

IMAGE FORMING APPARATUS

CROSS-REFERENCE TO RELATED APPLICATIONS

This application claims the priority benefit of Korean Patent Application No. 2009-0092385, filed on Sep. 29, 2009 in the Korean Intellectual Property Office, the disclosure of which is incorporated herein by reference.

BACKGROUND

1. Field

Embodiments relate to an image forming apparatus capable of detecting whether a cover is opened or closed in each of a general power mode and a power saving mode.

2. Description of the Related Art

Generally, an electrophotographic image forming apparatus forms an electrostatic latent image on an Organic Photo Conductor (OPC) using a laser beam, and the electrostatic latent image is developed with a toner, such that the image is printed on the paper. In order to attach the toner to the OPC, it is necessary for the OPC to be charged with positive (+) charges. To achieve this, hundreds of volts are generally applied to the OPC.

According to international specifications such as those of Underwriters Laboratories (UL), it is recommended that a current signal of 2 mA or higher does not flow through a human body when the output voltage of the high-voltage power-supply device is brought in contact with the human body. When a user who has a human-body resistance of about 2KΩ is exposed to a high voltage, the above-mentioned recommendation is devised for the user's safety, and is equally applied to the image forming apparatus such as a laser printer. For the above-mentioned recommendation, the electrophotographic image forming apparatus such as a laser printer includes a mechanical switch (or interlock switch) for blocking a power-supply signal when a developing unit including the toner and the OPC is detached from a main body or when a cover is opened due to a paper jam.

SUMMARY

An aspect of one or more embodiments provides an image forming apparatus capable of determining whether a cover is opened or closed in each of a general power mode and a power saving mode.

Additional aspects of embodiments will be set forth in part in the description which follows and, in part, will be obvious from the description, or may be learned by practice of the disclosure.

In accordance with an aspect of one or more embodiments, an image forming apparatus includes a cover opening/closing sensor to detect opening or closing of a cover, a cover opening/closing sensing power-supply input unit to provide or not to provide (selectively provide) a voltage different from an operation voltage of the image forming apparatus, to the cover opening/closing sensor according to the opening or closing of the cover, and an interlock switch to connect or not to connect (selectively connect) the cover opening/closing sensor to the cover opening/closing sensing power-supply unit according to the opening or closing of the cover.

The cover opening/closing sensing power-supply input unit may output an additional voltage different from the operation voltage of the image forming apparatus.

The cover opening/closing sensing power-supply input unit may include a diode to block an abnormal voltage from being applied to a power-supply unit which outputs an additional voltage different from the operation voltage of the image forming apparatus.

The apparatus may further include a high-voltage generator to generate a predetermined high voltage in an inner part of the image forming apparatus, wherein the cover opening/closing sensing power-supply input unit is located between the interlock switch and the high-voltage generator.

The apparatus may further include a first rectifier to rectify a commercial alternating current (AC) signal applied to the image forming apparatus and convert the rectified commercial AC signal into a direct current (DC) signal, a transformer to transform the DC signal into an AC signal, and a second rectifier to convert the AC signal generated from the transformer into the operation voltage.

The cover opening/closing sensing power-supply unit may be located between the second rectifier and the interlock switch.

The interlock switch may include a pawl unit, a first connector, and a second connector, wherein the pawl unit is connected to the cover opening/closing sensing power-supply input unit, the first connector is connected to the second rectifier, and the second connector is connected to the cover opening/closing sensor.

The pawl unit may be connected to the second connector when the cover is opened, and the pawl unit may be connected to the first connector when the cover is closed.

The interlock switch may include a pawl unit and a connector, wherein the pawl unit is connected to the cover opening/closing sensor and the connector is connected to the cover opening/closing sensing power-supply input unit.

The pawl unit may be connected to the connector when the cover is closed, and the pawl unit may be released from the connector when the cover is opened.

The cover opening/closing sensor may include a cover opening/closing sensing transistor that is turned on or off according to the opening or closing of the cover.

The cover opening/closing sensor may include a power-supply unit to generate a voltage so as to output a high or low signal according to the turn-on or turn-off operation of the cover opening/closing sensing transistor.

The cover opening/closing sensing transistor may be turned on when the cover is opened, and the cover opening/closing sensor may output the low signal when the cover opening/closing sensing transistor is turned on.

The cover opening/closing sensing transistor may be turned off when the cover is closed, and the cover opening/closing sensor may output the high signal when the cover opening/closing sensing transistor is turned off.

The apparatus may further include a controller to determine the opening or closing of the cover in response to the high or low signal of the cover opening/closing sensor.

The cover opening/closing sensor may be connected to the cover opening/closing sensing power-supply input unit when the cover is opened, and may be released from the cover opening/closing sensing power-supply input unit when the cover is closed.

The cover opening/closing sensor may include a logic gate to output a low or high signal according to the opening or closing of the cover.

The logic gate may include an AND gate, and the cover opening/closing sensor may include a power-supply unit to apply a high signal to a first one of two inputs of the AND gate.

The logic gate may include an AND gate and the interlock switch may apply a high signal to one of the two inputs of the AND gate when the cover is opened, and may apply a low signal to the second one of the two inputs of the AND gate when the cover is closed.

The apparatus may further include a controller to determine the opening or closing of the cover of the AND gate according to an output signal of the AND gate, wherein the controller determines the opening of the cover when the AND gate outputs the high signal, and determines the closing of the cover when the AND gate outputs the low signal.

The logic gate may include a NOT gate, and the cover opening/closing sensor may include a power-supply unit for providing the NOT gate with a voltage.

The NOT gate may output a high signal to an input unit when the cover is opened, and may output a low signal to the input unit when the cover is closed.

The apparatus may further include a controller to determine the opening or closing of the cover of the NOT gate according to an output signal of the NOT gate, wherein the controller determines the opening of the cover when the NOT gate outputs the low signal, and determines the closing of the cover when the NOT gate outputs the high signal.

In accordance with an aspect of one or more embodiments, an image forming apparatus includes a first cover opening/closing sensor to detect opening or closing of a cover in a power saving mode, a second cover opening/closing sensor to detect opening or closing of the cover in a general power mode, a cover opening/closing sensing power-supply input unit to provide or not to provide (selectively provide) a voltage different from an operation voltage of the image forming apparatus, to the first cover opening/closing sensor according to the opening or closing of the cover, and an interlock switch to connect or not to connect (selectively connect) the first cover opening/closing sensor to the cover opening/closing sensing power-supply unit according to the opening or closing of the cover.

The first cover opening/closing sensor may include a first cover opening/closing sensing transistor that is turned on or off according to the opening or closing of the cover.

The first cover opening/closing sensing unit may include a power-supply unit to generate a voltage such that it outputs a high or low signal according to the turn-on or turn-off operation of the first cover opening/closing sensing transistor.

The first cover opening/closing sensing transistor may be turned on when the cover is opened, and the first cover opening/closing sensor may output the low signal when the cover opening/closing sensing transistor is turned on.

The first cover opening/closing sensing transistor may be turned off when the cover is closed, and the first cover opening/closing sensor may output the high signal when the first cover opening/closing sensing transistor is turned off.

The apparatus may further include a controller to determine the opening or closing of the cover in response to the high or low signal of the first cover opening/closing sensor.

The first cover opening/closing sensor may be connected to the cover opening/closing sensing power-supply input unit when the cover is opened, and may be released from the cover opening/closing sensing power-supply input unit when the cover is closed.

The second cover opening/closing sensor may include a second cover opening sensing transistor that is turned on or off according to the opening or closing of the cover.

The second cover opening/closing sensor may include a power-supply unit to generate a voltage such that it outputs a high or low signal according to the turn-on or turn-off operation of the second cover opening/closing sensing transistor.

The second cover opening/closing sensing transistor may be turned off when the cover is opened, and the second cover opening/closing sensor may output the high signal when the second cover opening/closing sensing transistor is turned off.

The second cover opening/closing sensing transistor may be turned on when the cover is closed, and the second cover opening/closing sensor may output the low signal when the second cover opening/closing sensing transistor is turned on.

The apparatus may further include a controller to determine the opening or closing of the cover in response to the high or low signal of the second cover opening/closing sensor.

The cover opening/closing sensing power-supply input unit may output an additional voltage different from the operation voltage of the image forming apparatus.

The cover opening/closing sensing power-supply input unit may include a cover opening/closing sensing power-supply input transistor that is turned on or off in response to the general power mode or the power saving mode.

The cover opening/closing sensing power-supply input transistor may be turned off in the general power mode.

The cover opening/closing sensing power-supply input transistor may be turned on in the power saving mode.

The interlock switch may include a pawl unit, a first connector, and a second connector, wherein the pawl unit is connected to the cover opening/closing sensing power-supply input unit.

The apparatus may further include a first rectifier to rectify a commercial alternating current (AC) signal applied to the image forming apparatus and convert the rectified commercial AC signal to a direct current (DC) signal, a transformer to transform the DC signal into an AC signal, and a second rectifier to convert the AC signal generated from the transformer into the operation voltage.

The first connector may be connected to the second rectifier, and the second connector may be connected to the cover opening/closing sensor.

The pawl unit may be connected to the second connector when the cover is opened, and the pawl unit may be connected to the first connector when the cover is closed.

BRIEF DESCRIPTION OF THE DRAWINGS

These and/or other aspects of embodiments will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout.

Figure 1:
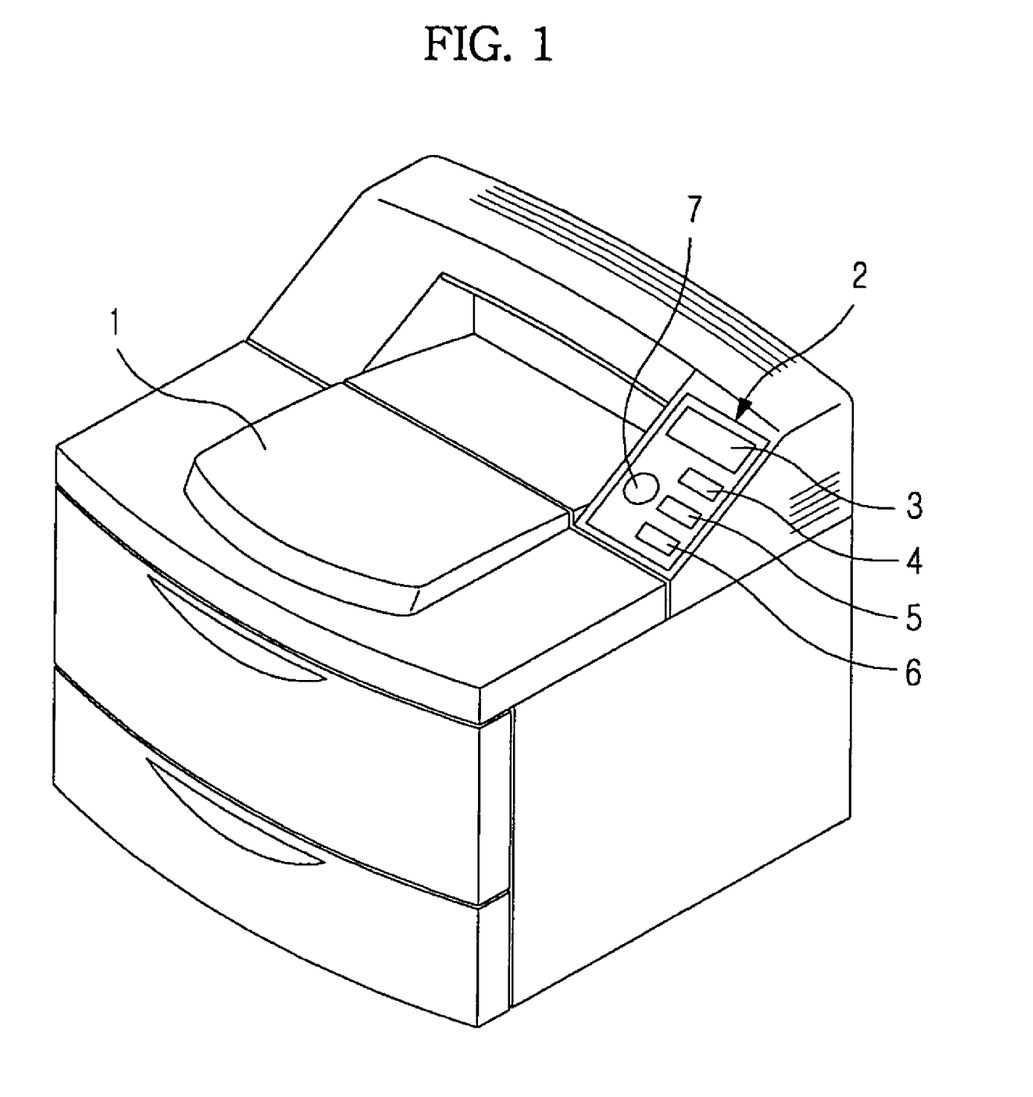
FIG. 1 is a view illustrating the appearance of an image forming apparatus according to an embodiment.

FIG. 1 is a view illustrating the appearance of an image forming apparatus according to an embodiment.

Referring to FIG. 1, the image forming apparatus includes a cover 1 for opening or closing an upper part of a main body and an operation panel 2 for controlling the image forming apparatus.

The cover 1 is opened when a toner cartridge is replaced or when the image forming apparatus is cleaned or repaired. In the image forming apparatus, when the cover 1 is opened in a general power mode, an interlock switch to be described later blocks a voltage from being applied to the high-voltage generator (HVPS) 110, and it is determined whether or not the cover 1 is opened such that a replacement time point of a toner cartridge can be determined.

The operation panel 2 includes a display 3 to display a status of the image forming apparatus, a menu key 4 to call a menu used for controlling the image forming apparatus, a move key 5 to navigate menus displayed on the display 3, a setup-value key 6 to add or subtract a predetermined setup value of the image forming apparatus (e.g., to add or subtract the number of pages to be printed), and a switch 7 for manually setting a power saving mode.

Figure 2:
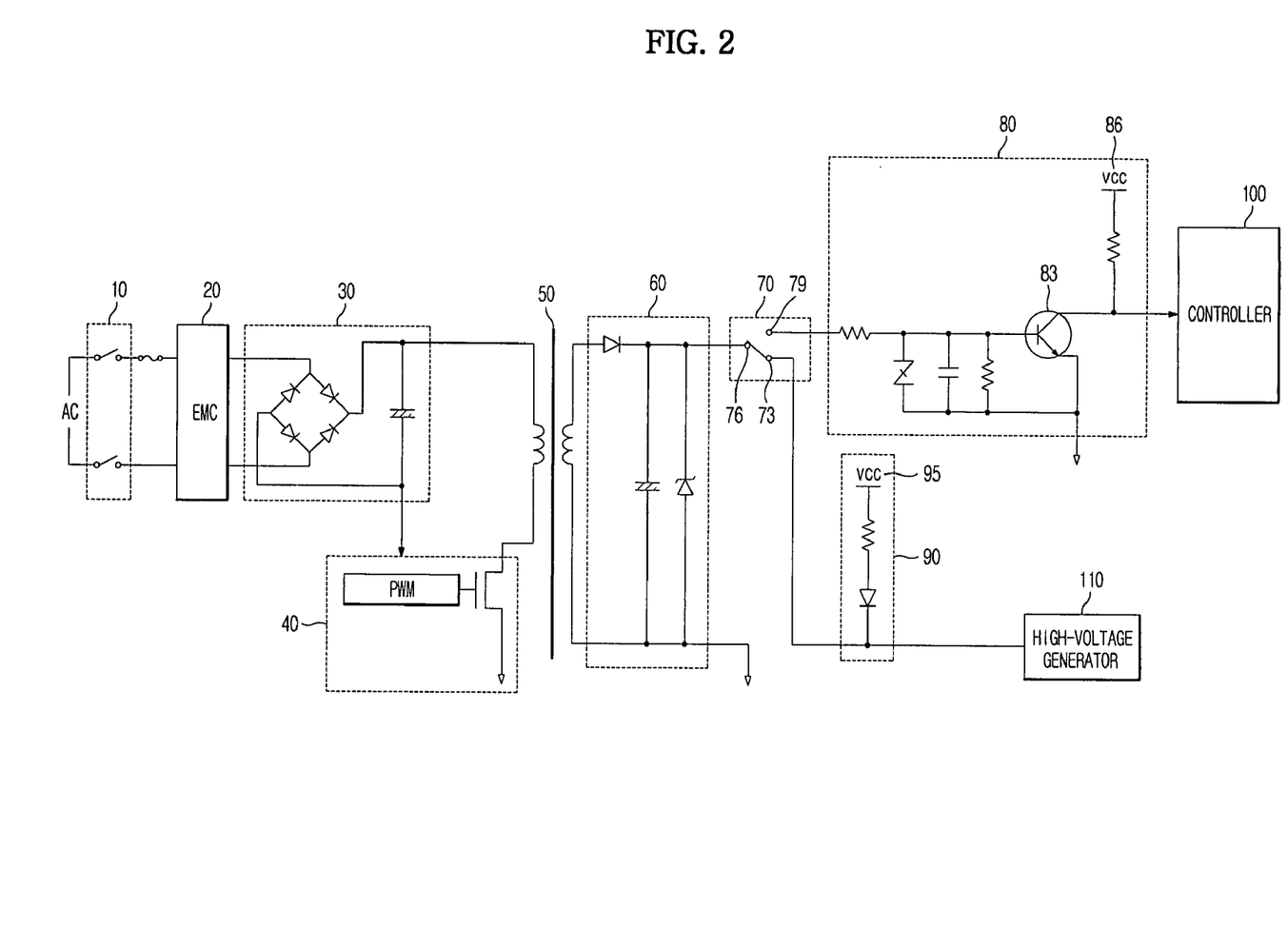
FIG. 2 is a circuit diagram illustrating a power-supply unit contained in an image forming apparatus according to an embodiment.

FIG. 2 is a circuit diagram illustrating a power-supply unit contained in an image forming apparatus according to an embodiment.

Referring to FIG. 2, the power-supply unit includes a switch 10, an electromagnetic compatibility (EMC) filter 20, a first rectifier 30, a switching controller 40, a transformer 50, a second rectifier 60, an interlock switch 70, a cover opening/closing sensor 80, a cover opening/closing sensing power-supply input unit 90, and a controller 100.

The switch 10 is connected between the EMC filter 20 and an alternating current (AC) power-supply unit providing a commercial AC power, and is protruded toward the exterior of the image forming apparatus such that it can be used by the user to turn the image forming apparatus on or off. The switch 10 is provided at the back or lateral side of the image forming apparatus, and applies a commercial AC power to the EMC filter 20, such that a switch having a high withstanding voltage or a high withstanding current is used.

The EMC filter 20 reduces noise contained in the commercial AC signal. Generally, the EMC filter 20 includes a coil and a capacitor that are connected in series or in parallel to the commercial AC signal.

The first rectifier 30 rectifies the commercial AC signal having passed through the EMC filter 20 so that it converts the AC signal into a direct current (DC) signal. The first rectifier 30 includes bridged diodes and a capacitor for smoothing an output signal of the bridged diodes.

The switching controller 40 switches a DC signal flowing in the transformer 50, so that it controls a current path formed at a primary side of the transformer 50.

The transformer 50 is controlled by the switching controller 40 so that it outputs an AC signal. The second rectifier 60 again rectifies the AC signal generated from the transformer 50, so that it generates a suitable DC voltage (e.g., 24V).

The interlock switch 70 includes a pawl unit 73, a first connector 76, and a second connector 79, and is connected to the cover 1. One end of the pawl unit 73 is connected to the cover opening/closing sensing power-supply input unit 90. The first connector 76 is connected to the second rectifier 60, and the second connector 79 is connected to the cover opening/closing sensor 80.

The interlock switch 70 uses a mechanical switch in consideration of malfunction of the image forming apparatus. The mechanical switch is mechanically operated according to the opening or closing of the cover 1.

The interlock switch 70 connects the pawl unit 73 to the first connector 76 when the cover 1 is closed, such that the cover opening/closing sensing power-supply input unit 90 is connected to the second rectifier 60.

If the cover opening/closing sensing power-supply input unit 90 is connected to the second rectifier 60, the operation voltage (e.g., 24V) generated from the second rectifier 60 is applied to the high-voltage generator (HVPS) 110. If the interlock switch 70 connects the cover opening/closing sensing power-supply input unit 90 to the second rectifier 60, the input end of the cover opening/closing sensor 80 is opened.

The interlock switch 70 connects the pawl unit 73 to the second connector 79 when the cover 1 is opened, so that such that the cover opening/closing sensing power-supply input unit 90 is connected to the second opening/closing sensor 80. If the interlock switch 70 connects the cover opening/closing sensing power-supply input unit 90 to the cover opening/closing sensor 80, the output voltage of the cover opening/closing sensing power-supply input unit 90 is applied to the cover opening/closing sensor 80. If the interlock switch 70 connects the cover opening/closing sensing power-supply input unit 90 to the cover opening/closing sensor 80, the output terminal of the second rectifier 60 is opened, such that no operation voltage is applied to the high-voltage generator 110.

The cover opening/closing sensor 80 includes a cover opening/closing sensing transistor 83, a resistor, a capacitor, a varistor (variable resistor), a first power-supply unit 86, and another resistor. The cover opening/closing sensing transistor 83 is turned on or off according to the voltage applied to a base terminal. The resistor, the capacitor, and the varistor are located at a front end of the base terminal of the cover opening/closing sensing transistor 83, such that an abnormal voltage is not applied to the cover opening/closing sensing transistor 83. The first power-supply unit 86 is installed at a collector line of the cover opening/closing sensing transistor 83, and outputs a high or low signal to the controller 100 according to the turn-on or turn-off signal of the cover opening/closing sensing transistor 83. The other resistor is connected to the first power-supply unit 86, such that it limits the magnitude of voltage applied to the cover opening/closing sensing transistor 83.

The cover opening/closing sensor 80 is connected to or released from the cover opening/closing power-supply unit 90 according to the opening or closing of the cover 1, such that it detects the opening or closing of the cover 1.

The cover opening/closing sensor 80 is connected to the cover opening/closing sensing power-supply unit 90 by the interlock switch 70 when the cover 1 is opened. The output voltage of the second power-supply unit 95 of the cover opening/closing sensing power-supply unit 90 is applied to the base terminal of the cover opening/closing sensing transistor 83, such that the cover opening/closing sensing transistor 83 is turned on.

If the cover opening/closing sensing transistor 83 is turned on, the output voltage of the first power-supply unit 86 flows through the cover opening/closing sensing transistor 83, such that the cover opening/closing sensor 80 outputs a low signal to the controller 100.

When the cover 1 is closed, the input terminal of the cover opening/closing sensor 80 is opened because the interlock switch 70 is not connected to the cover 1. If the input terminal of the cover opening/closing sensor 80 is opened, no voltage is applied to the cover opening/closing sensor 80, and the cover opening/closing sensing transistor 83 is turned off. If the cover opening/closing sensing transistor 83 is turned off, the current signal caused by the voltage of the first power-supply unit 86 flows through the output terminal of the cover opening/closing sensor 80, such that the cover opening/closing sensing transistor 83 outputs a high signal.

The cover opening/closing sensor 80 can detect the opening or closing of the cover 1 in each of the general power mode and the power saving mode of the image forming apparatus. The general power mode indicates a mode wherein the image forming apparatus can be normally operated. The power saving mode indicates a mode wherein some driving power-supply voltage (e.g., a voltage of 24V generated from the second rectifier) is turned off when the image forming apparatus is not used for at least a predetermined period of time. The image forming apparatus forms an electrostatic latent image on an Organic Photo Conductor (OPC) by a laser beam, and the electrostatic latent image is developed with a toner used as a developing solution, such that the image is printed on the paper. In order to attach the toner to the OPC, it is necessary for the OPC to be charged with positive (+) charges. As such, the HVPS 110 outputs hundreds of volts to the OPC. The image forming apparatus stops operation of the HVPS 110 in the power saving mode. For this operation, the image forming apparatus turns off a driving voltage generated from the second rectifier 60.

In the power saving mode, although the driving voltage generated from the second rectifier 60 is turned off, the second power-supply voltage 95 of the cover opening/closing sensing power-supply input unit 90 is turned on, such that another signal may be applied to the input terminal of the cover opening/closing sensor 80 according to the opening or closing of the cover 1. Therefore, another signal may be applied to the cover opening/closing sensor 80 according to the opening or closing of the cover 1 in the power saving mode, so that the opening or closing of the cover 1 can be detected.

The cover opening/closing sensing power-supply input unit 90 includes the second power-supply unit 95, a resistor, and a diode. The second power-supply unit 95 outputs a voltage for sensing the opening or closing of the cover. When the cover 1 is opened, the resistor minimizes the magnitude of voltage applied from the second power-supply unit 95 to the HVPS 110. When the cover 1 is closed, the diode prevents the output voltage of the second rectifier 60 from being applied to the second power-supply unit 95.

The cover opening/closing sensing power-supply input unit 90 is connected to either the output terminal of the second rectifier 60 or the cover opening/closing sensor 80 by means of the interlock switch 70. The cover opening/closing sensing power-supply input unit 90 is connected to the cover opening/closing sensor 80 when the cover 1 is opened. If the cover opening/closing sensing power-supply input unit 90 is connected to the cover opening/closing sensor 80, the voltage signal generated from the second rectifier 60 is not applied to the HVPS 110 connected to a rear end of the cover opening/closing sensing power-supply unit 90. When the cover 1 is closed, the cover opening/closing sensing power-supply unit 90 is connected to the output terminal of the second rectifier 60. If the cover opening/closing sensing power-supply input unit 90 is connected to the output terminal of the second rectifier 60, the operation voltage generated from the second rectifier 60 is applied to the HVPS 110.

The controller 100 determines the opening or closing of the cover 1 in response to the output signal of the cover opening/closing sensor 80. If the cover opening/closing sensor 80 outputs the high signal (e.g., a voltage of 5V or more), the controller 100 determines the opening of the cover 1. If the cover opening/closing sensor 80 outputs the low signal (e.g., a voltage of 0~2V or more), the controller 100 determines the closing of the cover 1.

Figure 3:
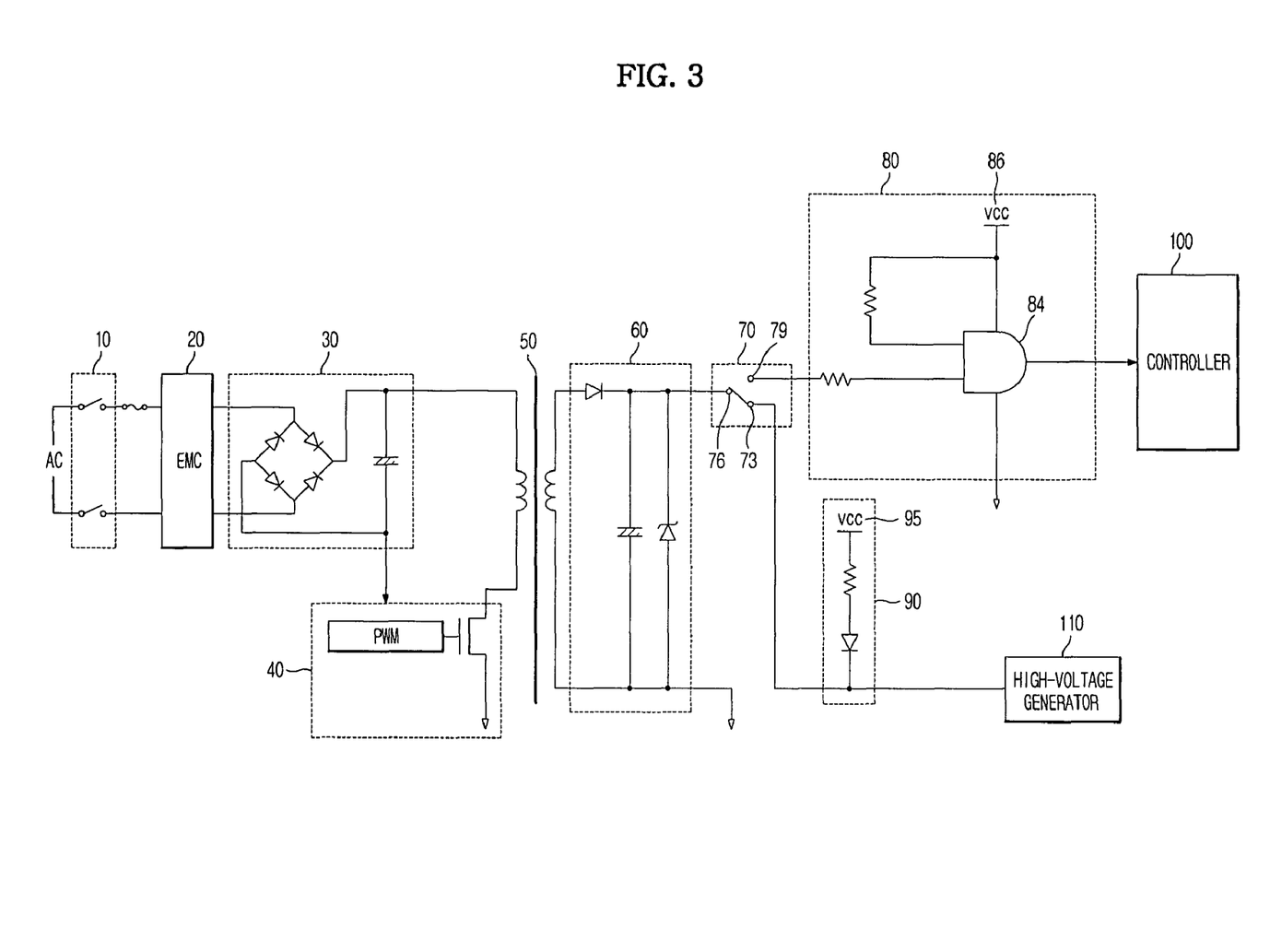
FIG. 3 is a circuit diagram illustrating a power-supply unit contained in an image forming apparatus according to an embodiment.

FIG. 3 is a circuit diagram illustrating a power-supply unit contained in an image forming apparatus according to an embodiment.

Referring to FIG. 3, the power-supply unit includes a switch 10, an EMC filter 20, a first rectifier 30, a switching controller 40, a transformer 50, a second rectifier 60, an interlock switch 70, a cover opening/closing sensor 80, a cover opening/closing sensing power-supply input unit 90, and a controller 100. In FIG. 3, the switch 10, the EMC filter 20, the first rectifier 30, the switching controller 40, the transformer 50, the second rectifier 60, the interlock switch 70, and the cover opening/closing sensing power-supply input unit 90 are identical to those of FIG. 1, and as such a detailed description thereof will be omitted herein for convenience of description.

The cover opening/closing sensor 80 includes an AND gate 84 for outputting a high or low signal according to the opening or closing of the cover 1, a first power-supply unit 86 for applying the high signal to one (i.e., a first input terminal) of two input terminals of the AND gate 84, a resistor for limiting the magnitude of voltage applied from the first power-supply unit 86 to the AND gate 84, and another resistor for preventing an abnormal voltage from being applied to the AND gate 84.

The cover opening/closing sensor 80 is connected to the output terminal of the second rectifier 60 or the cover opening/closing sensing power-supply input unit 90, such that it detects the opening or closing of the cover 1.

When the cover 1 is opened, the cover opening/closing sensor 80 is connected to the cover opening/closing sensing power-supply input unit 90 by the interlock switch 70. In this case, if the high signal is applied to one (i.e., the second input terminal) of the two input terminals of the AND gate 84 by the voltage generated from the second power-supply unit 95 of the cover opening/closing sensing power-supply input unit 90, the AND gate 84 outputs a high signal (e.g., a voltage of 5V or more).

When the cover 1 is closed, the cover opening/closing sensor 80 is connected to the interlock switch 70, such that the input terminal of the cover opening/closing sensor 80 is opened. If the input terminal of the cover opening/closing sensor 80 is opened, a low signal is applied to any one of two input terminals of the AND gate 84, and the AND gate 84 outputs the low signal (e.g., a voltage of 0~2V).

The controller 100 determines the opening or closing of the cover 1 in response to the output signal of the cover opening/closing sensor 80. That is, if the cover opening/closing sensor 80 outputs the high signal (e.g., a voltage of 5V or more), the controller 100 determines the opening of the cover 1. If the cover opening/closing sensor 80 outputs the low signal (e.g., a voltage of 0~2V or more), the controller 100 determines the closing of the cover 1.

Figure 4:
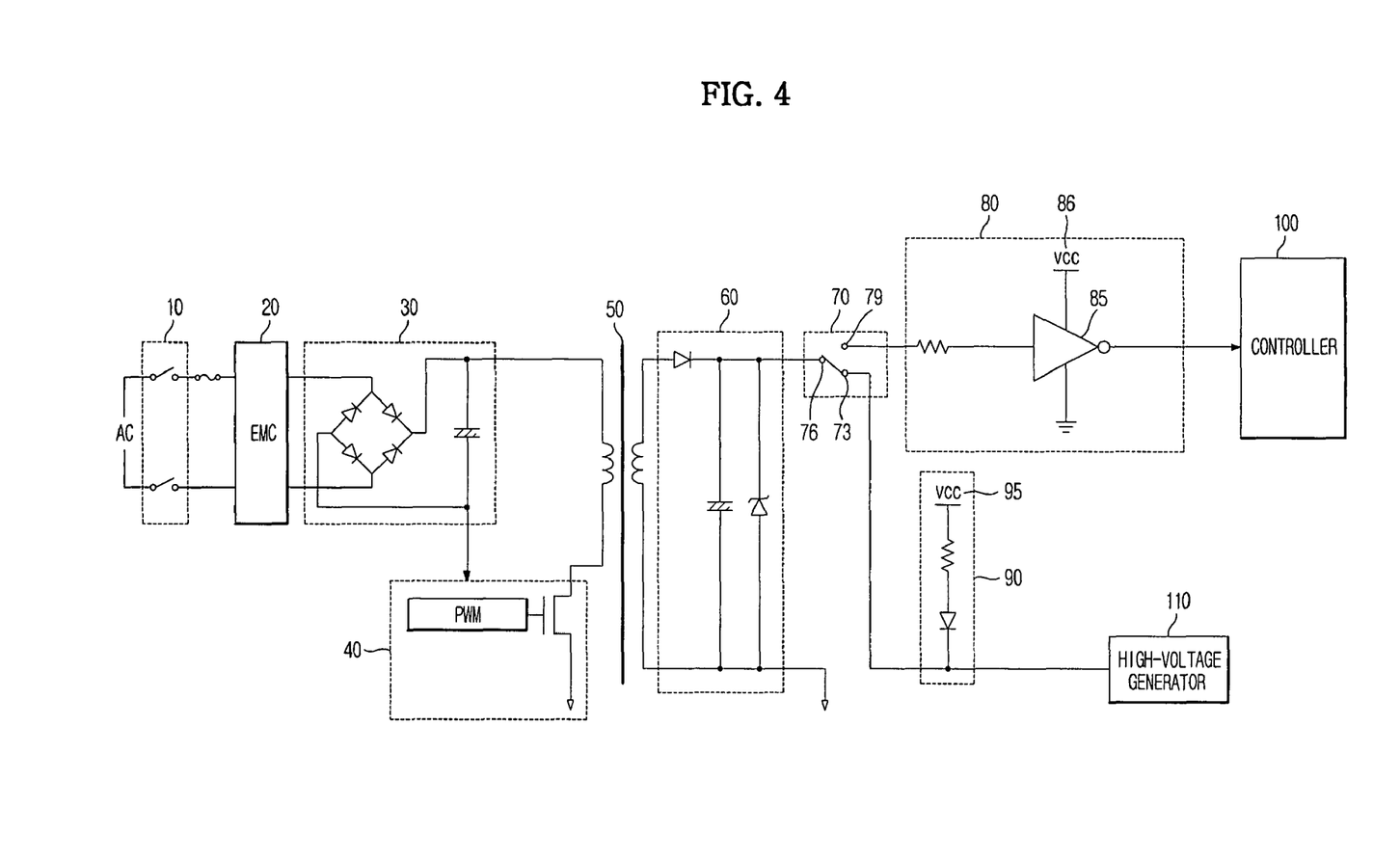
FIG. 4 is a circuit diagram illustrating a power-supply unit contained in an image forming apparatus according to an embodiment.

FIG. 4 is a circuit diagram illustrating a power-supply unit contained in an image forming apparatus according to an embodiment.

Referring to FIG. 4, the power-supply unit includes a switch 10, an EMC filter 20, a first rectifier 30, a switching controller 40, a transformer 50, a second rectifier 60, an interlock switch 70, a cover opening/closing sensor 80, a cover opening/closing sensing power-supply input unit 90, and a controller 100. In FIG. 4, the switch 10, the EMC filter 20, the first rectifier 30, the switching controller 40, the transformer 50, the second rectifier 60, the interlock switch 70, and the cover opening/closing sensing power-supply input unit 90 are identical to those of FIG. 1, and as such a detailed description thereof will be omitted herein for convenience of description.

The cover opening/closing sensor 80 includes a NOT gate 85 for outputting a high or low signal according to the opening or closing of the cover 1, and a resistor for preventing an abnormal voltage from being applied to the NOT gate 85.

The cover opening/closing sensor 80 is connected to the output terminal of the second rectifier 60 or the cover opening/closing sensing power-supply input unit 90, such that it detects the opening or closing of the cover 1.

When the cover 1 is opened, the cover opening/closing sensor 80 is connected to the cover opening/closing sensing power-supply input unit 90 by the interlock switch 70. In this case, if the high signal caused by the voltage generated from the second power-supply unit 95 of the cover opening/closing sensing power-supply input unit 90 is applied to the NOT gate 85, the NOT gate 85 outputs a low signal (e.g., a voltage of 0~2V).

When the cover 1 is closed, the cover opening/closing sensor 80 is connected to the interlock switch 70, such that the input terminal of the cover opening/closing sensor 80 is opened. If the input terminal of the cover opening/closing sensor 80 is opened, a low signal is applied to the NOT gate 85, and the NOT gate 85 outputs the high signal (e.g., a voltage of 5V or more).

The controller 100 determines the opening or closing of the cover 1 in response to the output signal of the cover opening/closing sensor 80. That is, if the cover opening/closing sensor 80 outputs the high signal (e.g., a voltage of 5V or more), the controller 100 determines the opening of the cover 1. If the cover opening/closing sensor 80 outputs the low signal (e.g., a voltage of 0~2V or more), the controller 100 determines the closing of the cover 1.

Figure 5:
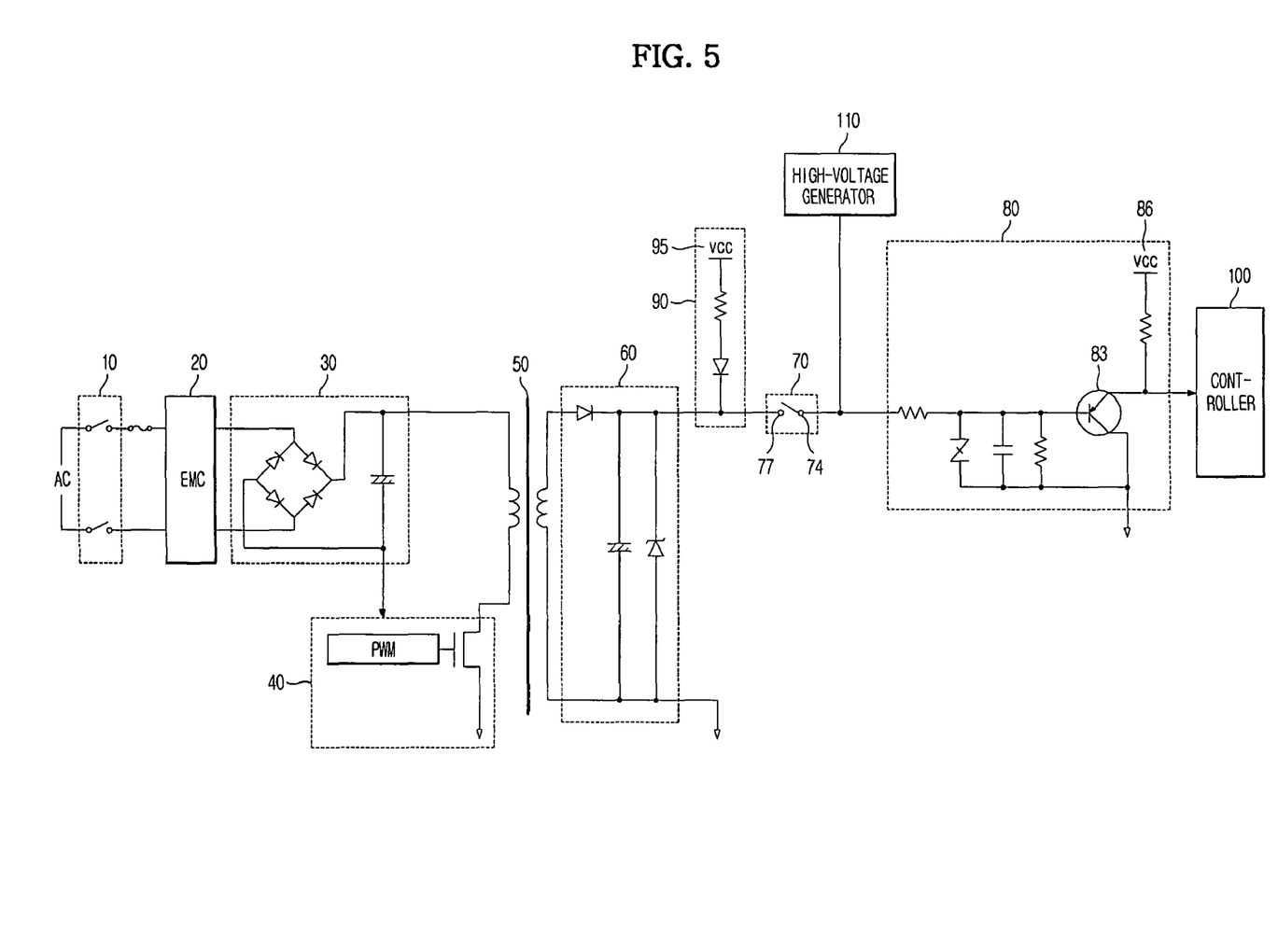
FIG. 5 is a circuit diagram illustrating a power-supply unit contained in an image forming apparatus according to an embodiment.

FIG. 5 is a circuit diagram illustrating a power-supply unit contained in an image forming apparatus according to an embodiment.

Referring to FIG. 5, the power-supply unit includes a switch 10, an EMC filter 20, a first rectifier 30, a switching controller 40, a transformer 50, a second rectifier 60, an interlock switch 70, a cover opening/closing sensor 80, and a cover opening/closing sensing power-supply input unit 90. In FIG. 5, the switch 10, the EMC filter 20, the first rectifier 30, the switching controller 40, the transformer 50, and the second rectifier 60 are identical to those of FIG. 1, and as such a detailed description thereof will be omitted herein for convenience of description.

The cover opening/closing sensing power-supply input unit 90 includes a second power-supply unit 95, a resistor for reducing the magnitude of voltage generated from the second power-supply unit 95, and a diode for preventing the output voltage of the second rectifier 60 from being applied to the second power-supply unit 95.

The cover opening/closing sensing power-supply input unit 90 is installed between the output terminal of the second rectifier 60 and the interlock switch 70.

The interlock switch 70 includes the pawl unit 74 and the connector 77. The interlock switch 70 is operated in conjunction with the cover 1. When the cover 1 is closed, the interlock switch 70 connects the cover opening/closing sensing power-supply input unit 90 to the cover opening/closing sensor 80. When the cover 1 is opened, the interlock switch 70 releases the cover opening/closing sensing power-supply input unit 90 from the cover opening/closing sensor 80.

The cover opening/closing sensor 80 may be connected to the cover opening/closing sensing power-supply input unit 90 through the interlock switch 70, such that it detects the opening or closing of the cover 1. The cover opening/closing sensor 80 outputs the high or low signal according to the opening or closing of the cover 1.

The cover opening/closing sensor 80 includes a cover opening/closing sensing transistor 83, a resistor, a capacitor, a varistor, a first power-supply unit 86, and another resistor. The cover opening/closing sensing transistor 83 is turned on or off according to the voltage applied to a base terminal. The resistor, the capacitor, and the varistor are located at a front end of the base terminal of the cover opening/closing sensing transistor 83, such that an abnormal voltage is not applied to the cover opening/closing sensing transistor 83. The first power-supply unit 86 is installed at the rear side of the cover opening/closing sensing transistor 83, and outputs a high or low signal to the controller 100 according to the turn-on or turn-off signal of the cover opening/closing sensing transistor 83. The other resistor is connected to the first power-supply unit 86, such that it limits the magnitude of voltage applied to the cover opening/closing sensing transistor 83.

The cover opening/closing sensor 80 is released from the cover opening/closing sensing power-supply input unit 90 when the cover 1 is opened. If the cover opening/closing sensor 80 is released or disconnected from the cover opening/closing sensing power-supply input unit 90, no voltage is applied to a base terminal of the cover opening/closing sensing transistor 83, such that the cover opening/closing sensing transistor 83 is turned off. If the cover opening/closing sensing transistor 83 is turned off, the current signal generated from the first power-supply unit 86 flows in the output terminal of the cover opening/closing sensor 80, such that the cover opening/closing sensing transistor 83 outputs a high signal.

When the cover 1 is closed, the cover opening/closing sensor 80 is connected to the cover opening/closing sensing power-supply input unit 90 through the interlock switch 70. If the cover opening/closing sensor 80 is connected to the cover opening/closing sensing power-supply input unit 90, the output voltage of the second power-supply unit 95 of the cover opening/closing sensing power-supply input unit 90 is applied to the base terminal of the cover opening/closing sensing transistor 83, such that the cover opening/closing sensing transistor 83 is turned on. If the cover opening/closing sensing transistor 83 is turned on, the current signal generated from the first power-supply unit 86 flows through the cover opening/closing sensing transistor 83, such that the output terminal of the cover opening/closing sensor 80 outputs a low signal.

The cover opening/closing sensor 80 can detect the opening or closing of the cover 1 in each of the general power mode and the power saving mode of the image forming apparatus.

In the general power mode and the power saving mode, the turn-on or turn-off operation of the cover opening/closing sensing transistor 83 is controlled by the output voltage of the cover opening/closing sensing power-supply input unit 90 in response to the opening or closing of the interlock switch 70, such that the cover opening/closing sensing transistor 83 outputs a high or low signal to the controller 100.

If the cover opening/closing sensor 80 outputs the high signal (e.g., a voltage of 5V or more), the controller 100 determines the opening of the cover 1. If the cover opening/closing sensor 80 outputs the low signal (e.g., a voltage of (e.g., a voltage of 0~2V or more), the controller 100 determines the closing of the cover 1.

Figure 6:
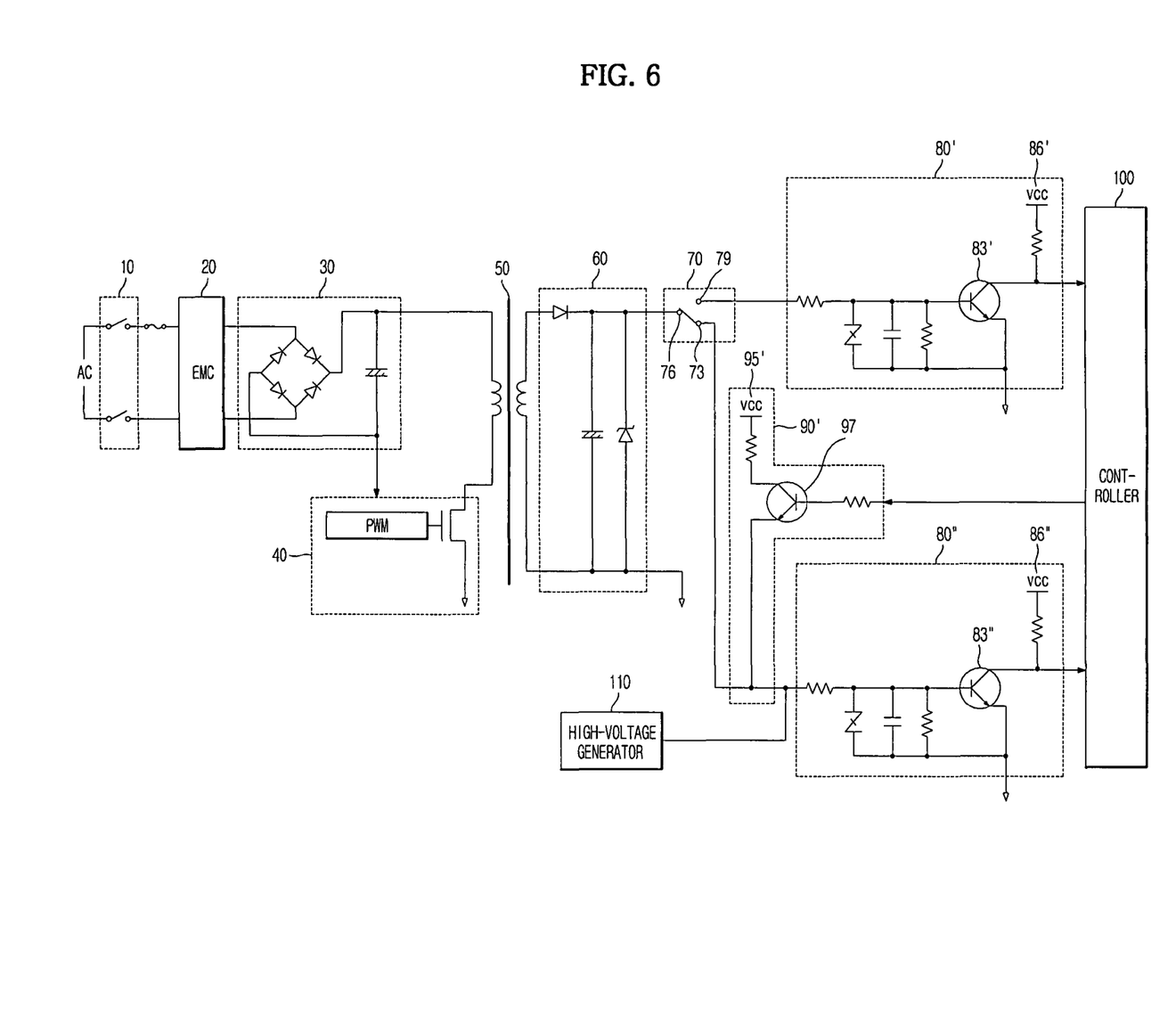
FIG. 6 is a circuit diagram illustrating a power-supply unit contained in an image forming apparatus according to another embodiment.

FIG. 6 is a circuit diagram illustrating a power-supply unit contained in an image forming apparatus according to an embodiment.

Referring to FIG. 6, the power-supply unit includes a switch 10, an EMC filter 20, a first rectifier 30, a switching controller 40, a transformer 50, a second rectifier 60, an interlock switch 70, first and second cover opening/closing sensors 80' and 80", a cover opening/closing sensing power-supply input unit 90', and a controller 100. In FIG. 6, the switch 10, the EMC filter 20, the first rectifier 30, the switching controller 40, the transformer 50, and the second rectifier 60 are identical to those of FIG. 1, and as such a detailed description thereof will be omitted herein for convenience of description.

The first cover opening/closing sensor 80' and the second cover opening/closing sensor 80" respectively include first and second cover opening/closing sensing transistors 83' and 83", and first and second power-supply units 86' and 86".

Each of the first cover opening/closing sensor 80' and the second cover opening/closing sensor 80" includes a resistor, a capacitor, a varistor, and another resistor. The first and second cover opening/closing sensing transistors 83' and 83" are turned on or off according to the voltage applied to a base terminal. The resistor, the capacitor, and the varistor are located at a front end of the base terminal of the first and second cover opening/closing sensing transistors 83' and 83", such that an abnormal voltage is not applied to the first and second cover opening/closing sensing transistors 83' and 83". The first and second power-supply units 86' and 86" are installed at a collector line of the first and second cover opening/closing sensing transistors 83' and 83", and output a high or low signal to the controller 100 according to the turn-on or turn-off signal of the first and second cover opening/closing sensing transistors 83' and 83". The other resistor is connected to each of the first and second power-supply units 86' and 86", such that it limits the magnitude of voltage applied to the first and second cover opening/closing sensing transistors 83' and 83".

The first cover opening/closing sensor 80' is connected to or disconnected from the cover opening/closing sensing power-supply input unit 90' according to the opening or closing of the cover 1 in the power saving mode, such that it detects the opening or closing of the cover 1.

When the cover 1 is opened in the power saving mode, the cover opening/closing sensor 80' is connected to the cover opening/closing sensing power-supply input unit 90' through the interlock switch 70. The output voltage of the third power-supply unit 95' of the cover opening/closing sensing power-supply input unit 90' is applied to the base terminal of the first cover opening/closing sensing transistor 83', such that the first cover opening/closing sensing transistor 83' is turned on. If the first cover opening/closing sensing transistor 83' is turned on, the output voltage of the first power-supply unit 86' flows through the first cover opening/closing sensing transistor 83', such that the output terminal of the first cover opening/closing sensor 80' outputs a low signal to the controller 100. Meanwhile, the cover opening/closing sensing power-supply input transistor 97 to be described later in the power saving mode is turned on.

When the cover 1 is closed in the power saving mode, the first cover opening/closing sensor 80' is not connected to the interlock switch 70, such that the input terminal of the first cover opening/closing sensor 80' is opened. If the input terminal of the first cover opening/closing sensor 80' is opened, no voltage is applied thereto. If no voltage is applied to the input terminal of the first cover opening/closing sensor 80', the first cover opening/closing sensing transistor 83' is turned off. If the first cover opening/closing sensing transistor 83' is turned off, a current signal caused by the voltage generated from the first power-supply unit 86 flows in the output terminal of the first cover opening/closing sensor 80' so that the first cover opening/closing sensing transistor 83' outputs a high signal to the controller 100.

The second cover opening/closing sensor 80" is connected to or disconnected from the second rectifier 60 according to the opening or closing of the cover 1 in the general power mode, such that it detects the opening or closing of the cover 1.

When the cover 1 is opened in the general power mode, the second cover opening/closing sensor 80" is disconnected from the second rectifier 60 through the interlock switch 70, and no voltage is applied to the second cover opening/closing sensor 80". If no voltage is applied to the second cover opening/closing sensor 80", the second cover opening/closing sensing transistor 83" is turned off. If the second cover opening/closing sensing transistor 83" is turned off, the current signal caused by the voltage generated from the second power-supply unit 95 flows into the output terminal of the second cover opening/closing sensor 80", such that the second cover opening/closing sensing transistor 83" outputs a high signal to the controller 100.

When the cover 1 is closed in the general power mode, the second cover opening/closing sensor 80" is connected to the second rectifier 60 through the interlock switch 70, the output voltage of the second rectifier 60 is applied to the base terminal of the second cover opening/closing sensing transistor 83", such that the second cover opening/closing sensing transistor 83" is turned on. If the second cover opening/closing sensing transistor 83" is turned on, the output voltage of the second power-supply unit 95 flows through the second cover opening/closing sensing transistor 83", so that the second cover opening/closing sensor 80 outputs the low signal to the controller 100.

Meanwhile, the cover opening/closing sensing power-supply input transistor 97 to be described later is turned off in the general power mode.

The cover opening/closing sensing power-supply input unit 90' includes a cover opening/closing sensing power-supply input transistor 97, a third power-supply unit 95', a first resistor, and a second resistor. The cover opening/closing sensing power-supply input transistor 97 controls the turn-on or turn-off operation according to the general power mode or the power saving mode. The third power-supply unit 95' outputs a power-supply signal for detecting the opening or closing of the cover. The first resistor minimizes the voltage generated from the second rectifier 60 to the third power-supply unit 95'. The second resistor minimizes the voltage generated from either the second rectifier 60 or the third power-supply unit 95' to the controller 100.

The cover opening/closing sensing power-supply input transistor 97 is turned off in the general power mode. If the cover opening/closing sensing power-supply input transistor 97 is turned off in the general power mode, the second cover opening/closing sensing transistor 83" of the second cover opening/closing sensor 80" is turned on or off according to whether the second cover opening/closing sensing transistor 83" is connected to the second rectifier 60. The second cover opening/closing sensor 80" outputs a low or high signal according to the turn-on or turn-off operation of the second cover opening/closing sensing transistor 83", such that it can detect the opening or closing of the cover 1.

The cover opening/closing sensing power-supply input transistor 97 is turned on in the power saving mode. If the cover opening/closing sensing power-supply input transistor 97 is turned on in the power saving mode, the first cover opening/closing sensing transistor 83" of the first cover opening/closing sensor 80' is turned on or off according to whether the first cover opening/closing sensing transistor 83' is connected to the cover opening/closing sensing power-supply input unit 90'. The first cover opening/closing sensor 80' outputs a low or high signal according to the turn-on or turn-off operation of the first cover opening/closing sensing transistor 83', such that it can detect the opening or closing of the cover 1.

The controller 100 outputs the low signal to the base terminal of the cover opening/closing sensing power-supply input transistor 97 in the general mode. If the low signal is input to the base terminal of the cover opening/closing sensing power-supply input transistor 97, the cover opening/closing sensing power-supply input transistor 97 is turned off. If the cover opening/closing sensing power-supply input transistor 97 is turned off, the voltage generated from the third power-supply unit 95" is not applied to the second cover opening/closing sensor 80". Therefore, the second cover opening/closing sensor 80" determines whether it is connected to the second rectifier 60 for generating the operation power-supply signal of the image forming apparatus, and outputs a high or low signal according to the determined result, such that it detects the opening or closing of the cover 1.

The controller 100 outputs the high signal to the base terminal of the cover opening/closing sensing power-supply input transistor 97 in the power saving mode. If the high signal is applied to the base terminal of the cover opening/closing sensing power-supply input transistor 97, the cover opening/closing sensing power-supply input transistor 97 is turned on. If the cover opening/closing sensing power-supply input transistor 97 is turned on, the voltage generated from the third power-supply unit 95' may be applied to the first cover opening/closing sensor 80' according to the opening or closing of the cover 1. Therefore, the first cover opening/closing sensor 80' determines whether it is connected to the cover opening/closing sensing power-supply input unit 90', and outputs a high or low signal according to the determined result, such that it detects the opening or closing of the cover 1. Meanwhile, in the power saving mode, in order to establish a low power level to be used for a predetermined time, the output voltage of the second rectifier 60 is turned off (0V).

As is apparent from the above description, the image forming apparatus can detect the opening or closing of a cover in a general power mode or a power saving mode, such that a user can immediately recognize the connection or non-connection status of expandable supplies or internal units of the image forming apparatus.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. An image forming apparatus comprising:
    a cover opening/closing sensor to detect opening or closing of a cover;
    a cover opening/closing sensing power-supply input unit to selectively provide a voltage, different from an operation voltage of the image forming apparatus, to the cover opening/closing sensor according to the opening or closing of the cover; and
    an interlock switch to selectively connect the cover opening/closing sensor to the cover opening/closing sensing power-supply unit according to the opening or closing of the cover.

2. The apparatus according to claim 1, wherein the cover opening/closing sensing power-supply input unit outputs an additional voltage different from the operation voltage of the image forming apparatus.

3. The apparatus according to claim 2, wherein the cover opening/closing sensing power-supply input unit includes:
    a diode to block an abnormal voltage from being applied to a power-supply unit which outputs an additional voltage different from the operation voltage of the image forming apparatus.

4. The apparatus according to claim 1, further comprising:
    a high-voltage generator to generate a predetermined high voltage in an inner part of the image forming apparatus,
    wherein the cover opening/closing sensing power-supply input unit is located between the interlock switch and the high-voltage generator.

5. The apparatus according to claim 1, further comprising:
    a first rectifier to rectify a commercial alternating current (AC) signal applied to the image forming apparatus and to convert the rectified commercial AC signal to a direct current (DC) signal;
    a transformer to transform the DC signal into an AC signal; and
    a second rectifier to convert the AC signal generated from the transformer into the operation voltage.

6. The apparatus according to claim 5, wherein the cover opening/closing sensing power-supply unit is located between the second rectifier and the interlock switch.

7. The apparatus according to claim 5, wherein the interlock switch includes a pawl unit, a first connector, and a second connector,
    wherein the pawl unit is connected to the cover opening/closing sensing power-supply input unit, the first connector is connected to the second rectifier, and the second connector is connected to the cover opening/closing sensor.

8. The apparatus according to claim 7, wherein the pawl unit is connected to the second connector when the cover is opened, and the pawl unit is connected to the first connector when the cover is closed.

9. The apparatus according to claim 1, wherein the interlock switch includes a pawl unit and a connector, wherein the pawl unit is connected to the cover opening/closing sensor and the connector is connected to the cover opening/closing sensing power-supply input unit.

10. The apparatus according to claim 9, wherein the pawl unit is connected to the connector when the cover is closed, and the pawl unit is released from the connector when the cover is opened.

11. The apparatus according to claim 1, wherein the cover opening/closing sensor includes a cover opening/closing sensing transistor that is turned on or off according to the opening or closing of the cover.

12. The apparatus according to claim 11, wherein the cover opening/closing sensor includes a power-supply unit to generate a voltage such that the power-supply unit outputs a high or low signal according to the turn-on or turn-off operation of the cover opening/closing sensing transistor.

13. The apparatus according to claim 12, wherein:
    the cover opening/closing sensing transistor is turned on when the cover is opened, and
    the cover opening/closing sensor outputs the low signal when the cover opening/closing sensing transistor is turned on.

14. The apparatus according to claim 12, wherein:
    the cover opening/closing sensing transistor is turned off when the cover is closed, and the cover opening/closing sensor outputs the high signal when the cover opening/closing sensing transistor is turned off.

15. The apparatus according to claim 12, further comprising:
a controller to determine the opening or closing of the cover in response to the high or low signal of the cover opening/closing sensor.

16. The apparatus according to claim 1, wherein the cover opening/closing sensor is connected to the cover opening/closing sensing power-supply input unit when the cover is opened, and is released from the cover opening/closing sensing power-supply input unit when the cover is closed.

17. The apparatus according to claim 1, wherein the cover opening/closing sensor includes a logic gate to output a low or high signal according to the opening or closing of the cover.

18. The apparatus according to claim 17, wherein the logic gate includes an AND gate and the cover opening/closing sensor includes a power-supply unit to apply a high signal to one of two inputs of the AND gate.

19. The apparatus according to claim 17, wherein the logic gate includes an AND gate and the interlock switch applies a high signal to a one of the two inputs of the AND gate when the cover is opened, and applies a low signal to the second one of the two inputs of the AND gate when the cover is closed.

20. The apparatus according to claim 17, wherein the logic gate includes an AND gate, the apparatus further comprising:
a controller to determine the opening or closing of the cover of the AND gate according to an output signal of the AND gate,
wherein the controller determines the opening of the cover when the AND gate outputs the high signal, and determines the closing of the cover when the AND gate outputs the low signal.

21. The apparatus according to claim 17, wherein the logic gate includes a NOT gate, and the cover opening/closing sensor includes a power-supply unit for providing the NOT gate with a voltage.

22. The apparatus according to claim 21, wherein:
the NOT gate outputs a high signal to an input unit when the cover is opened, and outputs a low signal to the input unit when the cover is closed.

23. The apparatus according to claim 22, further comprising:
a controller to determine the opening or closing of the cover according to an output signal of the NOT gate,
wherein the controller determines the opening of the cover when the NOT gate outputs the low signal, and determines the closing of the cover when the NOT gate outputs the high signal.

24. An image forming apparatus comprising:
a first cover opening/closing sensor to detect opening or closing of a cover in a power saving mode;
a second cover opening/closing sensor to detect opening or closing of the cover in a general power mode;
a cover opening/closing sensing power-supply input unit to selectively provide a voltage, different from an operation voltage of the image forming apparatus, to the first cover opening/closing sensor according to the opening or closing of the cover; and
an interlock switch to selectively connect the first cover opening/closing sensor to the cover opening/closing sensing power-supply unit according to the opening or closing of the cover.

25. The apparatus according to claim 24, wherein the first cover opening/closing sensor includes a cover opening/closing sensing transistor that is turned on or off according to the opening or closing of the cover.

26. The apparatus according to claim 25, wherein the first cover opening/closing sensing unit includes a power-supply unit to generate a voltage such that it outputs a high or low signal according to the turn-on or turn-off operation of the cover opening/closing sensing transistor.

27. The apparatus according to claim 25, wherein:
the cover opening/closing sensing transistor is turned on when the cover is opened, and
the first cover opening/closing sensor outputs the low signal when the cover opening/closing sensing transistor is turned on.

28. The apparatus according to claim 25, wherein:
the cover opening/closing sensing transistor is turned off when the cover is closed, and
the first cover opening/closing sensor outputs the high signal when the cover opening/closing sensing transistor is turned off.

29. The apparatus according to claim 26, further comprising:
a controller to determine the opening or closing of the cover in response to the high or low signal of the first cover opening/closing sensor.

30. The apparatus according to claim 24, wherein the first cover opening/closing sensor is connected to the cover opening/closing sensing power-supply input unit when the cover is opened, and is released from the cover opening/closing sensing power-supply input unit when the cover is closed.

31. The apparatus according to claim 24, wherein the second cover opening/closing sensor includes a cover opening sensing transistor that is turned on or off according to the opening or closing of the cover.

32. The apparatus according to claim 31, wherein the second cover opening/closing sensor includes a power-supply unit to generate a voltage so as to output a high or low signal according to the turn-on or turn-off operation of the cover opening/closing sensing transistor.

33. The apparatus according to claim 32, wherein:
the cover opening/closing sensing transistor is turned off when the cover is opened, and
the second cover opening/closing sensor outputs the high signal when the cover opening/closing sensing transistor is turned off.

34. The apparatus according to claim 32, wherein:
the cover opening/closing sensing transistor is turned on when the cover is closed, and
the second cover opening/closing sensor outputs the low signal when the cover opening/closing sensing transistor is turned on.

35. The apparatus according to claim 24, further comprising:
a controller to determine the opening or closing of the cover in response to the high or low signal of the second cover opening/closing sensor.

36. The apparatus according to claim 24, wherein the cover opening/closing sensing power-supply input unit outputs an additional voltage different from the operation voltage of the image forming apparatus.

37. The apparatus according to claim 24, wherein the cover opening/closing sensing power-supply input unit includes a cover opening/closing sensing power-supply input transistor that is turned on or off in response to the general power mode or the power saving mode.

38. The apparatus according to claim 37, wherein the cover opening/closing sensing power-supply input transistor is turned off in the general power mode.

39. The apparatus according to claim 37, wherein the cover opening/closing sensing power-supply input transistor is turned on in the power saving mode.

40. The apparatus according to claim 24, wherein the interlock switch includes a pawl unit, a first connector, and a second connector,
  wherein the pawl unit is connected to the cover opening/closing sensing power-supply input unit.

41. The apparatus according to claim 40, further comprising:
  a first rectifier to rectify a commercial alternating current (AC) signal applied to the image forming apparatus and convert the rectified commercial AC signal into a direct current (DC) signal;
  a transformer to transform the DC signal into an AC signal; and
  a second rectifier to convert the AC signal generated from the transformer into the operation voltage.

42. The apparatus according to claim 41, wherein the first connector is connected to the second rectifier, and the second connector is connected to the cover opening/closing sensor.

43. The apparatus according to claim 40, wherein the pawl unit is connected to the second connector when the cover is opened, and the pawl unit is connected to the first connector when the cover is closed.

* * * * *